United States Patent [19]

Su et al.

[11] Patent Number: 5,252,662
[45] Date of Patent: Oct. 12, 1993

[54] LOW VISCOSITY ACRYLIC HOT MELT ADHESIVES

[75] Inventors: Shiaonung Su, Buena Park, Calif.; Yehuda Ozari, Greenwich, Conn.; Richard R. Vargas, Southgate; Henry Lum, Jr., Whittier, both of Calif.

[73] Assignee: Avery Dennison Corporation, Pasadena, Calif.

[21] Appl. No.: 952,074

[22] Filed: Sep. 25, 1992

[51] Int. Cl.$^5$ .......................................... C08F 222/06
[52] U.S. Cl. ................ 524/549; 525/327.8; 526/271; 526/307.6
[58] Field of Search ............ 525/327.8; 526/271; 524/549

[56] References Cited

U.S. PATENT DOCUMENTS

| | | | |
|---|---|---|---|
| 3,925,282 | 12/1975 | Davis et al. | 524/398 X |
| 4,423,182 | 12/1983 | Bartman | 524/367 |
| 4,851,278 | 7/1989 | Enanoza | 428/195 |

*Primary Examiner*—Joseph L. Schofer
*Assistant Examiner*—Mark Nagumo
*Attorney, Agent, or Firm*—Christie, Parker & Hale

[57] ABSTRACT

A low viscosity hot melt acrylic pressure sensitive adhesive polymer is formed by bulk polymerization of at least one alkyl acrylate monomer containing from about 4 to 8 carbon atoms in the alkyl group and present in an amount of from about 60 to about 95% by weight of the polymer, from 1 to about 10% by weight of a copolymerizable amide monomer, from 1 to 10% by weight of a copolymerizble carboxylic acid, and a positive amount up to about 6% by weight of the monomers of a copolymerizable anhydride, said polymer formed thermally reversible crosslinks with a metal cation having a valence of from 2 to 4. Viscosity of the polymer is typically from 2 to 8 Pa.s at 150° C. as formed and increases up to 100 Pa.s at 150° C. on addition of the metal cation.

39 Claims, 1 Drawing Sheet

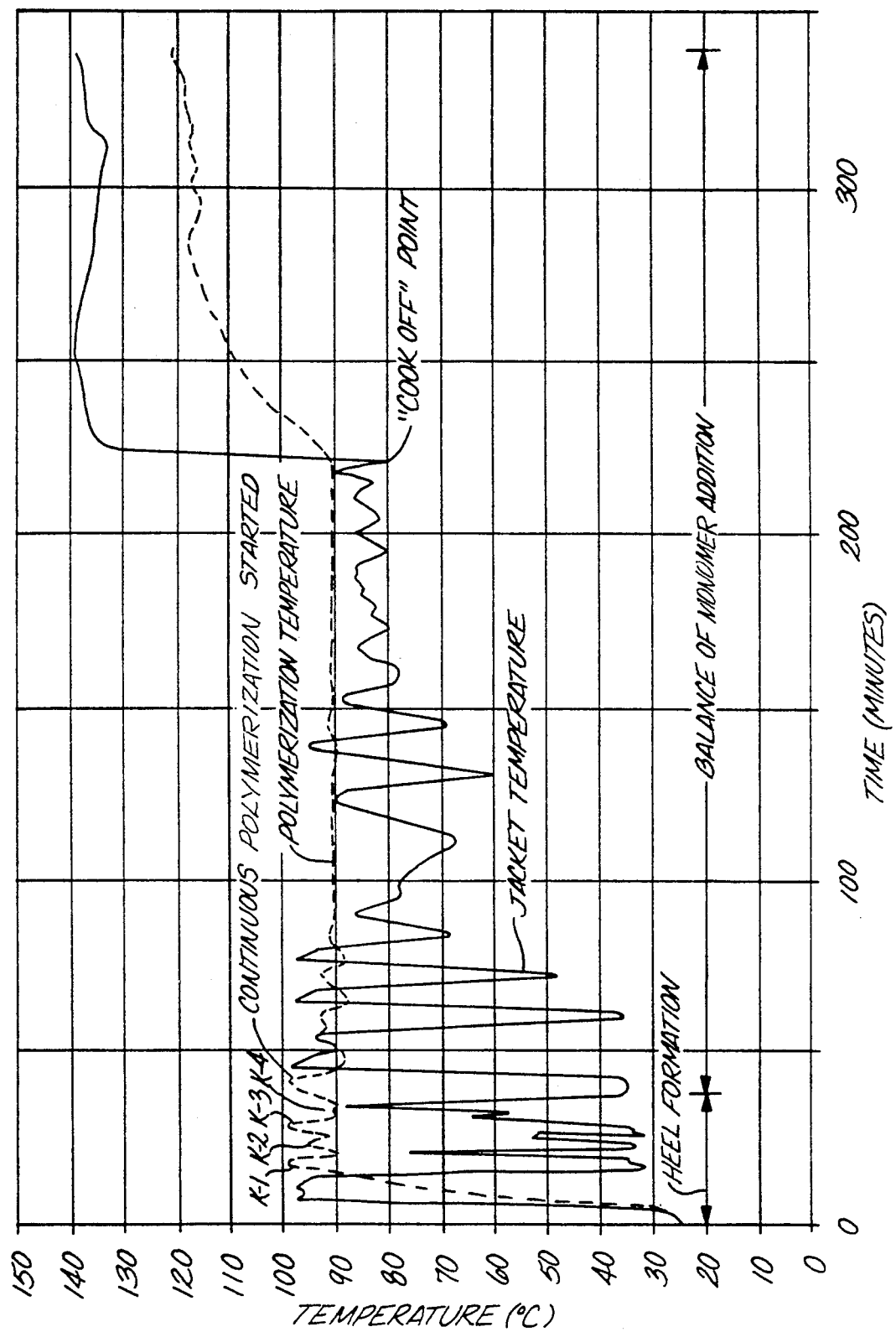

LOW VISCOSITY ACRYLIC HOT MELT ADHESIVES

FIELD OF INVENTION

This invention relates to an acrylic hot melt pressure sensitive adhesive comprised of an alkyl acrylate copolymerized with polar monomers including amide, acid, and anhydride monomers. The adhesive polymer exhibits a low viscosity as formed and when reversibly cross-linked by addition of a miscible organometallic compound.

BACKGROUND OF THE INVENTION

Block copolymer rubber based hot melt pressure sensitive adhesives (PSA's) are well known as showing unique viscosity-temperature profiles at hot melt coating and end use temperatures. Rubber based hot melt pressure sensitive adhesives are typically tackified styrene-isoprene-styrene, styrene-butadiene-styrene, styrene-butadiene, and/or styrene-isoprene block copolymers. In such block copolymers, the styrene end blocks form physical cross-link sites or domains which can be temporarily eliminated by heating thereby allowing the rubber to flow, and to reform upon cooling for end use requirements. This reversible cross-linking contributes to the unique processability characteristics of rubber based pressure sensitive adhesives.

Rubber based pressure sensitive adhesives have poor long term aging properties. By contrast, known acrylic based pressure sensitive adhesives exhibit excellent aging properties. However, they do not share the unique viscosity-temperature behavior of rubber based hot melt PSA's and they are more difficult to process.

Attempts have been made to develop hot melt acrylic pressure-sensitive adhesives with properties similar to rubber based adhesives. One approach has been to make high molecular weight polymers which exhibit good cohesive strength at ambient temperature. These high molecular weight polymers, however, create problems in the hot melt coating process due to high viscosity. One must therefore resort to processing using solvents to achieve acceptable coating viscosities. Solvents defeat the benefits of hot melt adhesives and create problems of pollution, waste generation and disposal.

Efforts to produce a processable low viscosity acrylic hot melt PSA have generally followed two paths.

One path has involved synthesizing polymers that require post coating irradiation to build up a cross-link network and the desired adhesive properties. This method requires extra processing time and equipment.

The other path involved synthesizing polymers that could be subsequently cross-linked by the addition of metal cation. Several techniques have been disclosed in the prior art which involve improving the cohesive strength of acrylic hot melt adhesives by making pressure-sensitive adhesive ionomers and incorporating metal cations such as zinc or cobalt. Such compositions, however, usually show high melt viscosities which prohibit use as hot melt adhesives.

A cross-linking mechanism between metal ions and carboxylate groups has been described, for instance, in U.S. Pat. No. 4,423,180, incorporated herein by reference, where melt viscosity has been lowered by adding a third component, namely an o-methoxy substituted acid or its mineral salt. This chelating mechanism was first disclosed in U.S. Pat. No. 3,331,729, incorporated herein by reference, where a zinc resinate was used to chemically coordinate with carboxylic groups of the polymers.

Other approaches were described in U.S. Pat. No. 3,740,366 for a pressure sensitive adhesive ionically cross-linked with polyvalent metals, such as zinc salts, and U.S. Pat. No. 3,769,254, for having improved cohesive strength PSA's by combining chelating metal alkoxide with carboxylic containing polymers. Similar approaches have been described in U.S. Pat. No. 3,925,282. Each of said patents is incorporated herein by reference.

U.S. Pat. No. 4,360,638 disclosed a similar mechanism of polymer and metal salt interaction by adding an o-methoxy substituted aryl acid to control the viscosity and cross-linking sites. Similar mechanisms have been described in U.S. Pat. No. 4,423,182 and U.S. Pat. No. 4,851,278 each of said patents also incorporated herein by reference.

There is a need for acrylic pressure sensitive adhesives which exhibit viscosity-temperature profiles which make them useful in hot melt adhesive coaters typically employed for rubber based hot melt adhesives.

SUMMARY OF THE INVENTION

The present invention is directed to acrylic hot melt pressure sensitive adhesive polymers which exhibit excellent viscosity-temperature profiles on formation and upon reversible cross-linking in situ or later and to the preparation of such adhesives by bulk polymerization techniques. The viscosity-temperature profiles make the adhesives compatible with equipment used for hot melt coating of rubber based pressure sensitive adhesives while providing all of the advantages of acrylic based adhesives. The desired viscosity temperature profile is achieved by copolymerizing into an acrylic backbone amide, anhydride, and carboxylic acid monomers which interact with an added metal cation to achieve "reversible" cross-linking properties where cross-links exist at end use temperature but are minimal at elevated temperature.

The low viscosity, hot melt acrylic pressure sensitive adhesives of the instant invention are formed by bulk polymerization of conventional acrylic monomers containing from 4 to about 8 carbon atoms in the alkyl group and present based on the weight of the monomers, in an amount of from 60 to 95% by weight preferably from 80 to 95% by weight. The alkyl acrylates are copolymerized in the presence of from about 1% to about 10% by weight preferably 2 to about 6% by weight of an unsaturated carboxylic acid, and from about 1 to about 10%, preferably 2 to about 6% of an unsaturated amide monomer and positive amount up to 6% preferably from about 2 to about 4% by weight of an unsaturated anhydride monomer which, in the presence of a metal carboxylate or resinate of a metal having from a valence of from 2 to about 4, preferably 2, forms thermally reversible cross-links. This provides a pressure sensitive adhesive polymer which is highly fluid at elevated temperatures because of disruption of bonds between the metal cation and the polar groups and form strong reversible cohesive cross-link bonds at normal use temperature.

Other monomers may also be present. In addition, external tackifiers can be added in amounts of from about 5% to about 30% by weight of the total composition to enhance adhesive properties, particularly adhesion to low energy surfaces.

The preferred alkyl acrylate is butyl acrylate; the preferred unsaturated carboxylic acid is acrylic acid; the preferred amide is N,N-dimethylacrylamide and the preferred anhydride is maleic anhydride. The preferred polymers include polymerized amounts of monomers having amide and carboxylic acid functionalities which synergistically give excellent viscometric and adhesive properties. The preferred polymer contains about 93% butyl acrylate, about 3% acrylic acid, about 2% N,N-dimethylacrylamide and about 2% maleic anhydride.

The route to forming the hot melt bulk polymers is to form an initial reaction heel formed by stagewise in situ polymerization of a portion of the monomers by incremental addition of initiator with reactor cooling to control reaction exotherm. The initiator rapidly decomposes to generate free radicals for formation of the polymer heel. Preferably, about 15 to about 20% by weight of the monomers are polymerized by stagewise addition of initiator to form the polymer heel. This is followed by continuous addition of the balance of monomers and initiator. Temperature is controlled by external cooling and rate of reaction to remain in the range of about 90° to about 120° C.

The polymer product has a low viscosity as formed, generally about 2 to about 8 Pa.s at 150° C. and after addition of the organometallic compound, i.e. about up to 100 Pa.s or more at 150° C. enabling hot melt coating using conventional apparatus.

THE DRAWING

The attached drawing depicts the temperature profiles from the reactants and the reactor jacket showing the region of heel formation where multiple additions of initiator is used to control, with cooling, reaction temperature and the region where monomer and initiator addition to the formed heel may be continuous or stagewise.

DETAILED DESCRIPTION OF THE INVENTION

There is provided in accordance with the present invention hot melt, acrylic based pressure sensitive adhesives which when formed have extremely low viscosities, e.g. as low as about 2 to about 8 Pa.s at 150° C. and up to about 100 Pa.s or more at 150° C. when combined with a metal cation.

By the term "low viscosity" as used broadly herein there is meant a viscosity sufficiently low for coating using conventional hot melt coaters.

The hot melt acrylic pressure sensitive adhesives have an acrylic backbone copolymerized with polar monomers which control viscosity and adhesion. The monomers include amide, anhydride, and carboxylic acid monomers which interact with a metal of an organometallic compound which provide thermally reversible cross-links which open when the compositions are heated to hot melt coating temperatures. This enables desirable coating of a substrate such as metal, plastic or paper. The crosslinks reform upon cooling to provide excellent shear and other adhesive properties.

The acrylic based hot melt adhesives of the instant invention have a glass transition temperature less than about 0° C., preferably less than about −20° C. Useful acrylic monomers include butylacrylate, 2-ethyl hexylacrylate, 2-methyl butylacrylate, isooctylacrylate, and the like. Butyl acrylate is presently preferred. Other monomers are or may be present.

One monomer of necessity is an amide monomer which may be present in an amount of from about 1 to about 10% preferably about 2 to about 6% by weight of the monomers. The amides include acrylamide; mono and dialkylacrylamides, such as N,N-dimethylacrylamide, N-methyl acrylamide, N,N-dimethylmethacrylamide and the like. N,N-dimethylacrylamide is the preferred amide monomer because of the ease by which it can be mixed with other monomers used in preparing the acrylic polymer by bulk polymerization and favorable toxicological properties. The carboxylic acid and anhydride monomers in the polymer interact with organometallic salts such as carboxylates and resinates of metals having a valence of 2 to 4 to form reversible cross-links which give favorable low viscosity at hot melt coating temperatures and desirable higher viscosities at end use temperature. Zinc octoate is the preferred organometallic salt.

Another class of monomers of importance are carboxylic acids containing from 3 to about 5 carbon atoms such as acrylic acid, methacrylic acid, fumaric acid, itaconic acid and the like, present in an amount of from about 1% to about 10%, preferably from 2 to about 6% by weight of the monomers. They function to enhance adhesion to high energy surfaces and to synergistically cooperate with polymerized amide monomers to enhance adhesive properties and control viscosity at both end use and coating temperatures. Acrylic acid is the preferred carboxylic acid.

Monomeric anhydrides preferably maleic anhydride, are typically present in a positive amount up to about 6% by weight of the total monomers preferably from 0.5 to about 6% of the total monomers and serve to control viscosity and provide additional thermally reversible cross-linking sites.

Other monomers which are functional in the invention to modify adhesive properties include diesters of an unsaturated dicarboxylic acid, containing from 4 to 12 carbon atoms, such as dibutyl fumarate, dioctyl fumarate, dioctyl maleate and the like. Their polymerization is advantageously aided by inclusion of vinyl esters such as vinyl acetate.

There may also be included among others monomers, alkyl methacrylates such as methylmethacrylate and the like, styrenic monomers such as styrene and the like.

Polymers produced according to the invention are bulk polymerized with initiation temperatures being in the range of 80° to 100° C. with polymerization occurring over a temperature range from about 90° to about 120° C. to produce polymers having a viscosity in the order of about 2 to about 8 pa.s at 150° C. They have long, stable shelf lives at ambient and elevated temperatures aione, and when combined with organometallic compounds, such as carboxylates and resinates of metals having a valence of from 2 to 4 form thermally reversible cross-links which increase viscosity up to about 100 Pa.s or more at 150° C. with dramatically higher viscosities at end use temperatures. Zinc octoate is the preferred organometallic compound. The amount of organometallic compound can range from about 1% to about 15% by weight, preferably about 1% to about 5% by weight of the total composition. Calcium components may also be used as well as other di- to tetravalent metals such as aluminum, copper, tin, titanium, vaandium, chromium, calcium, magnesium, barium, cobalt, and the like. Metal resinates are well known in the art and disclosed as, for instance, in U.S. Pat. No. 3,532,708 to Blance, incorporated herein by reference.

The complex formed uniquely causes the bulk polymers to exhibit low viscosity (e.g. up to about 100 Pa.s at 150° C.) to allow hot melt coating and high viscosities at end use temperature which are consonant with rubber based hot melt adhesives. Amide and acid functionalities in the polymers act synergistically to provide advantageous viscosity and adhesive properties.

Tack can be enhanced with the addition of a small amount of conventional tackifiers such as Foral 105 and Foral 85 manufactured by Hercules, Inc. Typically, the amount of tackifier provided, if provided at all, is from 5% to about 30% by weight of the total composition.

The acrylic hot melt pressure sensitive adhesives, prepared in accordance with this invention are polymers which have too low a cohesive strength in the absence of the metal cation to be useful as a pressure sensitive adhesive but when compounded with the metal cation, and if desired, a tackifier, provide a hot melt, acrylic pressure sensitive adhesive of excellent adhesive properties at use temperatures and because of thermally reversible crosslinks, are readily applicable to a variety of substrates by hot melt application techniques.

Although solvents may be used as carriers for introduction of one or more ingredients to the reactor, the polymers of the instant invention are formed under essentially solvent free conditions of bulk polymerization. In this procedure a small charge of initiator, that is in solution with the monomers is introduced into a temperature controlled reactor containing about 15 to about 20 per cent of the total monomers. Polymerization is initiated at a temperature of about 80° to about 100° C. by heating of the monomers with the small initiator charge. This is followed by stagewise addition of incremental amounts of initiator in solution with the monomers as shown in the Drawing to build an in situ polymer heel while maintaining a fairly even reaction temperature. The balance of the monomers and initiator are added to the formed polymer heel on a continuous basis or stagewise basis.

Start up normally involves the incremental stagewise addition of three or more charges of initiator into 5 to about 20% of the total of monomers. Heating is used to initiate the reaction of the first increment of initiator to generate free radicals by decomposition of the initiator. The first charge of initiator is allowed to react almost completely. The additional charges of initiator rekindles the reaction which is controlled by size of the initiator charge and external cooling. The initiator is normally added dissolved in the monomers. A second addition is normally followed by a third and a fourth addition of initiator etc., with amounts added designed to maintain reactor temperature within a prescribed temperature range preferably about 90° to about 100° C.

After the final increment addition of initiator, there is fed to the reactor the balance of the monomers and the same and/or a different initiator on a continuous or stagewise basis.

The initiator is selected to decompose at a rate which will prevent run away reaction conditions from occurring and to enable the build up of the initial polymer heel. Achieving that level of polymerization has been observed to provide a favorable "polydispersity", namely the ratio of the weight average molecular weight to number average molecular weight (Mw/Mn), of greater than about 5. The initial heel has been observed to have a polydispersity of about 2.5 increasing to above 5 typically above 5.5 by completion of the reaction.

The high polydispersity of the final product is an indication of a high population of high molecular weight polymer units which adds substantially to provide excellent shear quality to the adhesive. We have observed that reacting only about 3% of the monomers to form a heel produces a product of too low polydispersity and inferior shear properties.

The overall polymerization temperature can range from about 90° C. to about 120° C. and the product formed displays an extremely low viscosity in the absence of cross-linking. Typically, polymer viscosity as formed is in the order of about 2 to about 8 Pa.s at 150° C. but when reversibly cross-linked with a metal ion increases to a level up to about 100 Pa.s or more at 150° C. making the polymer suitable for coating using apparatus conventionally used with rubber based hot melt adhesives.

The preferred polymer formed in accordance with the instant invention contains about 93% by weight butyl acrylate, about 3% by weight acrylic acid, about 2% by weight N,N-dimethylacrylamide and 2% by weight maleic anhydride. The polymers are formed in the presence of a chain transfer agent, preferably a mercaptan, with n-dodecyl mercaptan (n-DDM) being preferred.

We have observed that carboxylic acid, in particular acrylic acid, and the amide act synergistically to provide, as will be shown herein, unusually good viscosity and adhesive characteristics, while maleic anhydride aids in achieving low viscosity for the hot melt adhesive polymer.

In the following Examples and controls, a Brookfield digital Viscometer (model RVTDV-II) equipped with a Thermosel was used to measure viscosity. The viscosity was measured at a temperature of 150° C., using spindle 29 at 5 rpm. Method PSTC-1 used to measure 180° peel adhesion; Method PSTC-7 was used to measure shear strength (RTS). The ability of a loop of pressure-sensitive adhesive tape to adhere to a stainless steel surface instantly and without external pressure was used to measure looptack. Measurements of molecular weight were made using a Waters HPLC. system equipped with Ultrastyragel columns from Columns Resolution Incorporated.

EXAMPLE 1

Butyl acrylate (93 kg), acrylic acid (3 kg), maleic anhydride (2 kg), N,N-dimethylacrylamide (2 kg), and n-DDM (0.35 kg) were charged into a mix tank and stirred. After dissolving, 15 kg of this monomer mix was transferred into a jacketed reactor equipped with sensors and controllers. The reactor was then evacuated and backflushed twice with nitrogen.

The remainder of the monomer mix was equally divided into two mix tanks. Vazo 52 (242.5 grams), a free radical initiator made by DuPont, was charged into one of the tanks. After dissolving the initiator approximately 310 grams of the mix was collected in a separate Erlenmeyer flask to supply initiator charges for polymerizing a polymer heel in the reactor. The first charge (87 grams) which contained 0.5 gram of Vazo 52 was pumped into the stirred reactor.

With reference to the Drawing, the reactor jacket was then quickly heated to 96° C. A nitrogen bleed into the reactor was maintained during this time. When the reactor reached 82° C., the temperature rise (exotherm)

became more pronounced as polymerization commenced (K-1). Jacket temperature was quickly dropped at this moment until it reached approximately 33° C. With a set point of 90° C. on the reactor, the reaction temperature reaches approximately 100° C. The center-shaft of the stirrer was at 50 rpm; augers were at 150 rpm.

The reaction mass was then allowed to cool. As it approached 90° C., a second initiator charge (43.5 grams) was pumped to deliver 0.25 grams of Vazo 52 to the reactor. The introduction of this second charge (K-2), and subsequent charges, was timed with the temperature changes of the jacket to maintain temperature between 90 and 100° C. Initiator charges are introduced when the jacket temperature begins to rise. The second charge produces a temperature rise that may approach 100° C.

In a similar manner, two more initiator charges of 87 grams (K-3 and K-4) each were introduced into the reactor, allowing monomer conversion to reach about 80%. After the temperature had maximized with the fourth charge (90°-94° C.), the balance of the monomer mix and initiator was fed into the newly formed polymer heel at a rate of 472 grams/minute over a three hour feed time. Nitrogen bleed was stopped at this time.

The other tank was charged with 242.5 grams of Vazo 52 shortly before the first tank was exhausted. After the second mix tank was completely fed into the reactor, a charge of Vazo 67 (150–400 grams) dissolved in butyl acetate (150–400 grams) was immediately added to polymerize the residual monomers. The jacket temperature was set at 140° C. The reaction mass temperature was allowed to rise to over 100° C. for at least 30 minutes. The reaction mass temperature was in the range of 110°-120° C. Vacuum stripping is then employed to remove the butyl acetate and any unreacted monomers. The resulting polymer had a viscosity of 2-8 Pa.s at 150° C.

After vacuum stripping, 400 grams of Santonox R, an antioxidant made by Monsanto, was charged into the reactor. After approximately 15 minutes the cross-linking agent zinc octoate was added while the resulting polymer was still in the reactor. The reactor charge could also be discharged at this point for addition of the cross-linker in another vessel. Approximately 2.0-2.2 pphr zinc octoate was used to provide a polymer having a viscosity of approximately 100 Pa.s at 150° C.

Table 1 shows the adhesive properties to stainless steel of the cross-linked polymer as formed.

EXAMPLE 2

Pigmentation and Cross-linking

Into a 10-gallon sigma blade mixer there was charged 15 kilograms of the polymer initially formed in Example 1. The mixer temperature was 150° C. A nitrogen flush was employed. The worm setting was at 1 and blade setting at 2. While mixing, 30 grams of Anti Terra U manufactured and sold by Byk Chemie, a dispersing agent and 10.5 kilograms of titanium dioxide (Tipure R-900) made by DuPont were added. Mixing was continued for 5-10 minutes, allowing for wet out of the titanium dioxide. The mix will appear "lumpy". Zinc octoate (approximately 600–660 grams) was then added in three portions. Mixing was continued for another 30 minutes. After the titanium dioxide has become dispersed, an additional 15 kilograms of polymer was added. Mixing was allowed to continue for another 50 minutes and the mixture was discharged. Final viscosity was 100 Pa.s at 150° C.

When coated on 1.5 mil mylar at 32 g/m$^2$ the opacity has been found suitable to provide a white background for labels.

Table 2 compares the adhesive properties of the externally cross-linked and pigmented polymer to the in situ cross-linked polymer (Table 1).

|  | Table 1 | Table 2 |
|---|---|---|
| Shear, 500 g., 0.25 sq. in, min | 60–120 | 60–120 |
| 180° Peel, N/m, 20 min. dwell | 600–700 | 500–700 |
| Looptack, N/m | 300–400 | 300–400 |

The test substrate was stainless steel

EXAMPLES 3-6

The effect of zinc octoate on polymer performance was studied. The polymer contained 92% butyl acrylate, 2% acrylic acid, 4% maleic anhydride and 2% acrylamide.

Table 3 list the adhesive performance with 1-3 parts zinc octoate per 100 parts polymer. Two parts per 100 parts polymer zinc octoate was found to be the optimum level.

TABLE 3

|  | EXAMPLE 3 | EXAMPLE 4 | EXAMPLE 5 | EXAMPLE 6 |
|---|---|---|---|---|
| Base Polymer/Zinc Octoate | 100/1.0 | 100/2.0 | 100/2.5 | 100/3.0 |
| Base polymer Viscosity, @ 150° C., Pa · s | 5.9 | 5.9 | 5.9 | 5.9 |
| Zn Cross Linked Viscosity @ 150° C., Pa · s | 31.8 | N/A | N/A | N/A |
| Time for 10% viscosity increase, (Hrs) | 5 | N/A | N/A | 1.5 |
| Coat weight, g/m$_2$ | 25 | 26 | 26 | 21 |
| Facestock | mylar, paper | mylar, paper | mylar, paper | mylar, paper |

TABLE 3-continued

|  | EXAMPLE 3 | | EXAMPLE 4 | | EXAMPLE 5 | | EXAMPLE 6 | |
|---|---|---|---|---|---|---|---|---|
|  | 1.5 mil | | 1.5 mil | | 1.5 mil | | 1.5 mil | |
| 180° peel, N/M | 971 | — | 810 | — | 426 | — | 584 | — |
| Loop tack, N/M | 472 | 596 | 530 | 651 | 370 | 560 | 177 | — |
| RTS, ½" × ½" ½ Kg min | 21 | 14.2 | 166 | 97 | 610 | 600 | 471 | 503 |

EXAMPLE 7

An adhesive is formed as in Example 1 substituting 2-ethyl hexylacrylate for butylacrylate. The adhesive has better wetting ability and loop track than an adhesive containing butyl acrylate. The adhesive made has a glass transition temperature of $-54.3°$ C. Compounding procedures used zinc octoate for making a hot melt pressure sensitive adhesive.

EXAMPLE 8 AND 9 AND CONTROLS 1 AND 2 AND 3

To demonstrate a synergistic interaction between acrylic acid and acrylamide together in the polymer composition, a comparison between adhesive prepared using acrylic acid or acrylamide (Controls 1 and 2), and in which both were absent (Control 3), in comparison to using acrylic acid and acrylamide in equal amounts (Examples 8 and 9), are shown in Table 4. The viscosity comparison shows that the viscosity of Example 8 (6% total) or Example 9 (3% total) are more than the sum of the viscosities of Controls 1 and 2. That means there is an interaction involved when the mixture is used. The shear performance also indicates that using acid and amide together provides more cross-linking and extra cohesive strength to the system.

TABLE 4

|  | Ex. 8 | Ex. 9 | Cont. 1 | Cont. 2 | Cont. 3 |
|---|---|---|---|---|---|
| Butylacrylate, % | 84 | 87 | 87 | 87 | 90 |
| Dibutylfumarate, % | 10 | 10 | 10 | 10 | 10 |
| Acrylic acid, % | 3 | 1.5 | 3 | 0 | 0 |
| Acrylamide, % | 3 | 1.5 | 0 | 3 | 0 |
| Viscosity, 175° C., Pa · s | 5.2 | 5.1 | 4.3 | 1 | 1 |
| Compound with % Zn Octoate | 2 | 2 | 2 | 2 | 2 |
| Viscosity after compounding: | | | | | |
| 175° C., Pa · s | 22 | 14.2 | 6.5 | 2.2 | — |
| 150° C., Pa · s | 68 | 35.2 | 14.8 | 4.8 | — |
| 125° C., Pa · s | 223.2 | 222 | 37.3 | 12.4 | — |
| 100° C., Pa · s | >1300 | 884 | 123.3 | 42.2 | — |
| 180° peel, N/M | 1004 | 620 | 445 | 588 | 17.5 |
| Looptack, N/M | 710 | 788 | 830 | 752 | 128 |
| RTS, 500 g, ½" × ½", min | 13.7 | 8.1 | 2.9 | 1.7 | 0.1 |

EXAMPLE 10

A major market opportunity for this hot melt adhesive is in the area of industrial labels for durable goods applications. The current emphasis is geared towards having an adhesive with permanent adhesion to various substrates including metals, coated metals, and plastics. Slot coating is necessary for obtaining a good quality sample. The adhesive of this invention performs well for these applications and their requirements. Samples of the adhesive of Example 1, are coated on a 6" die and laminated with four different sandwich constructions at 25 g/m² coat weight. The release paper used is a platinum catalyzed silicone release coated backing. Four facestocks are 2 mil polyester, paper, aluminum foil, and polypropylene. The last one is designed for transfer tape usage. Testing conditions included those specified in UL969. The labels formed meet Underwriters Laboratory specifications.

What is claimed is:

1. A low viscosity hot melt acrylic pressure-sensitive adhesive polymer formed by bulk polymerization and comprising, on a polymerized basis, at least one alkyl acrylate containing from 4 to about 8 carbon atoms in the alkyl group and present in an amount of from about 60 to about 95% by weight of the polymer, about 1 to about 10% by weight of the polymer of a copolymerizable amide, about 1 to about 10% by weight of at least one copolymerizable carboxylic acid and a positive amount up to about 6% by weight of a copolymerizable anhydride, said polymer forming thermally reversible cross-links in the presence of a metal cation having a valence of from 2 to 4.

2. A pressure sensitive adhesive as claimed in claim 1 in which the amide is present in an amount of from about 2 to about 6 percent by weight of the polymer.

3. A pressure sensitive adhesive as claimed in claim 2 in which the amide is present in an amount of from 2 to about 6% by weight of the polymer.

4. A pressure sensitive adhesive as claimed in claim 3 in which the amide comprises N,N-dimethylacrylamide.

5. A pressure sensitive adhesive as claimed in claim 2 in which the amide comprises N,N-dimethylacrylamide.

6. A pressure sensitive adhesive as claimed in claim 1 in which one copolymerizable carboxylic acid is present in an amount of from about 2 to about 6% by weight of the polymer.

7. A pressure sensitive adhesive as claimed in claim 6 in which the amide comprises N,N-dimethylacrylamide.

8. A pressure sensitive adhesive as claimed in claim 1 in which the anhydride is present in an amount of from about 0.5 to about 6% by weight of the polymer.

9. A pressure sensitive adhesive as claimed in claim 8 in which the amide comprises N,N-dimethylacrylamide.

10. A pressure sensitive adhesive as claimed in claim 1 in which the amide comprises N,N-dimethylacrylamide.

11. A pressure sensitive adhesive as claimed in claim 1 in which the carboxylic acid comprises acrylic acid.

12. A pressure sensitive adhesive as claimed in claim 11 in which the anhydride is maleic anhydride.

13. A pressure sensitive adhesive as claimed in claim 12 in which the metal cation is $Zn^{++}$.

14. A pressure sensitive adhesive as claimed in claim 13 in which the amide is present in an amount of from 2 to about 6 percent by weight of the polymer.

15. A pressure sensitive adhesive as claimed in claim 13 in which the carboxylic acid is present in an amount of from 2 to about 6 percent by weight of the polymer.

16. A pressure sensitive adhesive as claimed in claim 15 in which the carboxylic acid is acrylic acid.

17. A pressure sensitive adhesive as claimed in claim 13 in which the amide is N,N-dimethylacrylamide.

18. A pressure sensitive adhesive as claimed in claim 13 in which the carboxylic acid is acrylic acid.

19. A pressure sensitive adhesive as claimed in claim 18 in which the alkyl acrylate is butyl acrylate.

20. A pressure sensitive adhesive as claimed in claim 13 in which the alkyl acrylate is butyl acrylate.

21. A pressure sensitive adhesive as claimed in claim 13 in which at least one tackifier compatible with the polymer is present, said total amount of tackifier present being from about 5 to about 30% by weight based on the total weight of the tackifier and polymer.

22. A pressure sensitive adhesive as claimed in claim 1 in which the metal cation is $Zn^{++}$.

23. A low viscosity hot melt pressure sensitive adhesive composition comprising an acrylic polymer comprising, on a polymerized basis, and based on the weight of the polymer, from about 80 to about 95 percent by weight of an alkyl acrylate containing from 2 to about 8 carbon atoms in the alkyl group, at least one unsaturated carboxylic acid containing from 3 to about 5 carbon atoms and present in an amount of from about 1 to about 10 percent by weight selected from the group consisting of acrylamide and N,N-dimethylacrylamide, present in an amount of from about 1 to about 10 percent by weight, and from 0.5 to about 6% by weight of amleic anhydride, said polymer being formed by bulk polymerization and having a viscosity of up to about 100 Pa.s at 150° C. when thermal reversibly cross-linked by addition of an organometallic compound containing a metal cation having a valence of from 2 to 4.

24. A low viscosity hot melt pressure sensitive adhesive composition comprising an acrylic polymer and comprising on a polymerized basis about 93% butyl acrylate, about 3% acrylic acid, about 2% N,N-dimethylacrylamide and about 2% maleic anhydride, said polymer formed by bulk polymerization and having a viscosity of about 2 to about 8 Pa.s at 150° C. and up to about 100 Pa.s at 150° C. in the presence of about 2 to about 2.2 parts of zinc octoate per 100 parts polymer.

25. A low viscosity hot melt acrylic pressure-sensitive adhesive polymer composition having thermally reversible cross-links formed with a metal cation having a valence of from 2 to 4, said polymer formed by bulk polymerization ad comprising, on a polymerized basis, at least one alkyl acrylate containing from 4 to about 8 carbon atoms in the alkyl group and present in an amount of from about 60 to about 95% by weight of the polymer, about 1 to about 10% by weight of the polymer of a copolymerizable amide, about 1 to about 10% by weight of at least one copolymerizable carboxylic acid and a positive amount up to about 6% by weight of a copolymerizable anhydride, said composition containing from 1 to about 15% by weight of a metal cation having a valence of from 2 to 4.

26. A pressure-sensitive adhesive as claimed in claim 25 in which one copolymerizable carboxylic acid is present in an amount of from about 2 to about 6% by weight of the polymer.

27. A pressure-sensitive adhesive as claimed in claim 26 in which the amide is present in an amount of from 2 to about 6% by weight of the polymer.

28. A pressure-sensitive adhesive as claimed in claim 25 which is the anhydride is present in an amount of from about 0.5 to about 6% by weight of the polymer.

29. A pressure-sensitive adhesive as claimed in claim 25 in which the amide comprises N,N-dimethylacrylamide.

30. A pressure-sensitive adhesive as claimed in claim 25 in which the carboxylic acid comprises acrylic acid.

31. A pressure-sensitive adhesive as claimed in claim 30 in which the anhydride is maleic anhydride.

32. A pressure-sensitive adhesive as claimed in claim 25 in which the metal cation is $Zn^{++}$.

33. A low viscosity hot melt pressure sensitive adhesive composition comprising an acrylic polymer comprising, on a polymerized basis, and based on the weight of the polymer, from about 80 to about 95 percent by weight of the polymer of an alkyl acrylate containing from 2 to about 8 carbon atoms in the alkyl group, at least one unsaturated carboxylic acid containing from 3 to about 5 carbon atoms and present in an amount of from about 1 to about 10 percent by weight based on the weight of the polymer, an amide monomer selected from the group consisting of acrylamide and N,N-dimethylacrylamide, present in an amount of from about 1 to about 10 percent by weight of the polymer, and from 0.5 to about 6% by weight of the polymer of maleic anhydride, said polymer being formed by bulk polymerization and having a viscosity of up to about 100 Pa.s at 150° C. and having thermally reversible cross-links by the presence of from about 1 to about 15% by weight of the composition of an organometallic compound containing a metal cation having a valence of from 2 to 4.

34. A pressure-sensitive adhesive as claimed in claim 23 in which the amide is present in an amount of from 2 to about 6 percent by weight of the polymer.

35. A pressure-sensitive adhesive as claimed in claim 33 in which the carboxylic acid is present in an amount of from 2 to about 6 percent by weight of the polymer.

36. A pressure-sensitive adhesive as claimed in claim 35 in which the carboxylic acid is acrylic acid.

37. A pressure-sensitive adhesive as claimed in claim 35 in which the alkyl acrylate is butyl acrylate.

38. A pressure-sensitive adhesive as claimed in claim 33 in which at least one tackifier compatible with the polymer is present, said total amount of tackifier present being from about 5 to about 30% by weight based on the total weight of the composition.

39. A low viscosity hot melt pressure-sensitive adhesive composition comprising an acrylic polymer and about 2 to about 2.2 parts of zinc octoate per 100 parts polymer, said polymer containing on a polymerized basis about 93% butyl acrylate, about 3 acrylic acid, about 2% N,N-dimethylacrylamide and about 2% maleic anhydride, said polymer formed by bulk polymerization, and said composition having a viscosity up to about 100 Pa.s at 150° C.

* * * * *

UNITED STATES PATENT AND TRADEMARK OFFICE
CERTIFICATE OF CORRECTION

PATENT NO. : 5,252,662
DATED : October 12, 1993
INVENTOR(S) : Shiaonung Su; Yehuda Ozari; Richard R. Vargas; Henry Lum, Jr.

It is certified that error appears in the above-indentified patent and that said Letters Patent is hereby corrected as shown below:

On the title page, Item [57]:

Abstract, Line 8, change "copolymerizble" to -- copolymerizable --.

Column 4, lines 64,65, change "vaandium" to -- vanadium --.

Column 5, line 50, change "initiator is normally added dissolved" to -- initiator normally added is dissolved --.

Column 6, line 44, after "HPLC" delete the period.

Column 7, lines 57,61, In TABLE 3 change "Pa·s" to -- Pa.s -- (both occurrences).

Column 8, line 43, after "Table 3" change "list" to -- lists --.

Column 9, line 21, change "EXAMPLE 8 AND 9" to -- EXAMPLES 8 AND 9 --.
Column 9, line 25, change "adhesive" to -- adhesives --.
Column 9, lines 45,48-51, In Table 4 change "Pa·s" to -- Pa.s -- (all occurrences).

UNITED STATES PATENT AND TRADEMARK OFFICE
CERTIFICATE OF CORRECTION

PATENT NO. : 5,252,662
DATED : October 12, 1993
INVENTOR(S) : Shiaonung Su; Yehuda Ozari; Richard R. Vargas; Henry Lum, Jr.

It is certified that error appears in the above-indentified patent and that said Letters Patent is hereby corrected as shown below:

In the Claims:

Column 11, line 43, after "weight" insert -- an amide --.
Column 11, line 47, change "amleic" to -- maleic --.
Column 11, line 64, change "ad" to -- and --.

Column 12, line 15, after "which" delete "is".
Column 12, lines 44,45, change "claim 23" to -- claim 33 --.
Column 12, line 63, change "3 acrylic acid" to -- 3% acrylic acid --.

Signed and Sealed this

Fourteenth Day of June, 1994

BRUCE LEHMAN

Attest:

Attesting Officer

Commissioner of Patents and Trademarks